3,356,447
PROCESS FOR THE MANUFACTURE OF ALKALI METAL TRIPOLY PHOSPHATES HAVING DESIRABLE CHARACTERISTICS

George E. Tafler, Don Mills, Ontario, Canada, assignor to Electric Reduction Company of Canada, Ltd., Toronto, Ontario, Canada
No Drawing. Filed Aug. 5, 1963, Ser. No. 300,092
12 Claims. (Cl. 23—106)

This invention relates to a process for the manufacture of alkali metal tripoly phosphates having desirable solubility, hardness and phase distribution characteristics and high bulk densities in the granular form.

It is well known that granular sodium tripoly phosphate of a high bulk density offers various desirable characteristics as a raw material in certain types of detergent formulations.

Granular sodium tripoly phosphate of high bulk density commonly is produced in recycle kilns by recirculating sodium tripoly phosphate in the kiln and spraying the recirculating material with a solution of sodium ortho phosphate.

The disadvantages of this process are the high capital cost of the kiln and associated equipment and the relatively large amount of energy required in view of the necessity of employing high rates of recirculation and great amounts of heat. Furthermore, the recycle kiln process only can produce sodium tripoly phosphate which contains a predominance of the phase II form thereof, whereas a high percentage of sodium tripoly phosphate in the phase I form often is desirable in certain applications.

Accordingly, it is one object of my invention to provide a relatively simple process for the manufacture of alkali metal tripoly phosphates having desirable solubility, hardness and phase distribution characteristics and high bulk densities in granular form.

High bulk density granular materials commonly are produced by compacting powdered feeds under considerable pressures, followed by forming the resulting mass into the desired granular particle size. When such a technique is applied to sodium tripoly phosphate, I have found that the resulting granular product is commercially unsuitable, because its solubility characteristics are altered, so that it acquires a tendency to form slowly soluble masses. It is also characteristic of such compacted sodium tripoly phosphate granules that they are comparatively soft and cannot withstand much handling without considerable breakdown.

I have made the unexpected discovery that by introducing small amounts of water into the powdered feed material before compaction, high bulk density granular sodium tripoly phosphate with the desired characteristics can be made. Also, by my process the undesirable formation of slowly soluble masses is eliminated, and the strength of the granules can be greatly increased.

In brief, in accordance with my invention, an alkali metal tripoly phosphate is compacted in the presence of water distributed throughout the alkali metal tripoly phosphate, and water subsequently is removed from the compacted material.

My invention will become more apparent from the following detailed description and examples.

In accordance with this invention, a powdered alkali metal tripoly phosphate is evenly mixed with water in relatively small amounts in any of the well known commercial mixers. The water may be added in liquid form, for example, in which event it is desirable to spray the water in small atomized drops into the alkali metal tripoly phosphate which should be agitated continuously. At least a part of the water so added will be taken up by the alkali metal tripoly phosphate and will be present in the form of water of crystallization.

Alternatively, the water may be present as water of constitution in sodium orthophosphate, which is defined as the hydrogen and oxygen atoms which are present in the sodium orthophosphate molecule ($Na_2HPO_4$ or $NaH_2PO_4$) in the proportions in which they are present in water ($H_2O$), and which are liberated as free water by the thermal dehydration of the orthophosphate molecule.

If the alkali metal tripoly phosphate being processed is sodium tripoly phosphate, any proportion of the phase I and the phase II forms of the material may be employed.

I have found that the addition of even very small amounts of water to the alkali metal tripoly phosphate improves the solubility of the product of my process. As the mount of water which is added is increased up to about 1.5% based on the weight of water to the weight of alkali metal tripoly phosphate, there is an increase in the abrasion resistance of the product of my process. While water in excess of 1.5% may be employed, there is no apparent advantage to be gained by doing so, as there is no further appreciable increase in solubility rate or abrasion resistance above 1.5%, and since the added water is removed after compaction by heating, for example, it is desirable to employ the smallest possible amount of water, consistent with achieving desirable results.

After the water has been thoroughly distributed throughout the alkali metal tripoly phosphate, the mixture is compacted in any of the well known compaction machines.

Following compaction, the compacted alkali metal tripoly phosphate is dried to remove the water added thereto. This step may be carried out in any of the well known heating devices employed for drying material. For example, the compacted alkali metal tripoly phosphate may be dried in a rotary drum with sufficient heat to evaporate the water, but insufficient to cause phase conversion of the alkali metal tripoly phosphate, of course.

In the event that the water was present as water of constitution in sodium ortho phosphate, the compacted material should be heated to a temperature and for a time is sufficient to convert the sodium ortho phosphate to sodium tripoly phosphate, which also will result in the water being evaporated, of course.

Following the drying step, the dried compacted material may be granulated into a high density product in commercial grinding or crushing machines available for the purpose, the granules then being screened in the usual manner. If desired, the granulation step may precede the drying step.

The following is given as an example of the practice of my invention:

Powdered sodium tripoly phosphate was fed to a Fitzpatrick Model 6Dx7L "Chilsonator" (trademark). This is a commercial compaction machine consisting of steel rolls pressed together by hydraulic means. In these experiments the hydraulic pressure applied to the rolls was 2,500 p.s.i., and the speed of the compaction rolls was 10 r.p.m. The introduction of water to the feed material was done in a rotary mixer. The compacted flakes were sized, screened and then dried to remove the added water. The table shows the results of the experiments:

| Run No. | Water Added to Feed, Percent | Bulk Density, lbs./cu. ft. | Solubility of Granular Product | Abrasion Resistance, Percent Weight Loss |
|---|---|---|---|---|
| 1 | 0 | 64.4 | Very Poor, 10 min. | 10.7 |
| 2 | 0.25 | 65.5 | Good, 1½ min. | 3.4 |
| 3 | 1.35 | 66.0 | Good, 1½ min. | 2.8 |

While I have disclosed preferred embodiments of my invention, those skilled in the art will appreciate that changes and modifications may be made therein without departing from the spirit and scope of my invention as defined in the appended claims.

What I claim as my invention is:

1. A process which comprises compressing by externally applied pressure a finely-divided alkali metal tripoly phosphate into a compact in the presence of water distributed throughout said alkali metal tripoly phosphate, and subsequently heating to remove said water from the compressed alkali metal tripoly phosphate, said water being present in said alkali metal tripoly phosphate prior to compressing in an amount effective to render the alkali metal tripoly phosphate compact capable of formation into a granular form having, after removal of said water, a high bulk density and increased abrasion resistance and an increased rate of solubility relative to alkali metal tripoly phosphate compressed in a like manner, absent the presence of water.

2. The process according to claim 1 wherein the alakli metal tripoly phosphate is sodium tripoly phosphate.

3. The process according to claim 2 wherein said sodiumt tripoly phosphate is in both the phase I and phase II forms.

4. The process according to claim 1 wherein said alkali metal tripoly phosphate is in powdered form and said water is mixed with said alkali metal tripoly phosphate.

5. The process according to claim 1 wherein said alkali metal tripoly phosphate is sodium tripoly phosphate, said water is water of constitution of sodium ortho phosphate, said sodium ortho phosphate being distributed throughout said sodium tripoly phosphate, and wherein said water is subsequently removed from said compact by heating the compacted material to an extent and for a time sufficient to convert the sodium ortho phosphate to sodium tripoly phosphate.

6. The process according to claim 1 wherein the weight of said water distributed throughout said alkali metal tripoly phosphate relative to the weight of said alkali metal tripoly phosphate is up to about 1.5%.

7. The process according to claim 1 wherein the weight of said water distributed throughout said alkali metal tripoly phosphate relative to the weight of said alkali metal tripoly phosphate is about 1.5%.

8. The process according to claim 2 wherein said sodium tripoly phosphate is in powdered form, said water is mixed with said sodium tripoly phosphate, and the weight of said water distributed throughout said sodium tripoly phosphate relative to the weight of said sodium tripoly phosphate is up to about 1.5%.

9. The process according to claim 8 wherein the weight of said water distributed throughout said sodium tripoly phosphate relative to the weight of said sodium tripoly phosphate is about 1.5%.

10. The process according to claim 9 wherein said sodium tripoly phosphate is in both the phase I and phase II forms.

11. The process according to claim 5 wherein the weight of said water distributed throughout said sodium tripoly phosphate relative to the weight of said sodium tripoly phosphate is up to about 1.5%.

12. The process according to claim 11 wherein the weight of said water distributed throughout said sodium tripoly phosphate relative to the weight of said sodium tripoly phosphate is about 1.5%.

References Cited

UNITED STATES PATENTS

| | | | |
|---|---|---|---|
| 3,030,180 | 4/1962 | Bigot | 23—106 |
| 3,233,967 | 2/1966 | Shen | 23—106 |

OSCAR R. VERTIZ, *Primary Examiner.*

O. F. CRUTCHFIELD, L. A. MARSH,
*Assistant Examiners.*